United States Patent [19]

Ward, Sr.

[11] 4,280,386

[45] Jul. 28, 1981

[54] PAPERBOARD SLITTING APPARATUS

[75] Inventor: William F. Ward, Sr., Hampstead, Md.

[73] Assignee: The Ward Machinery Company, Cockeysville, Md.

[21] Appl. No.: 106,541

[22] Filed: Dec. 26, 1979

[51] Int. Cl.[3] .......................... B23D 19/06; B26D 1/24

[52] U.S. Cl. .......................................... 83/500; 83/481; 83/665; 83/675; 83/698; 76/101 A; 493/370

[58] Field of Search ................. 83/407, 408, 469, 481, 83/491, 492, 495, 500, 501, 502, 663, 665, 673, 675, 676, 698; 93/58.2 R, 58.2 F, 58.4; 76/101 A; 493/370

[56] References Cited

U.S. PATENT DOCUMENTS

| | | | |
|---|---|---|---|
| 62,846 | 2/1867 | Hatch | 83/500 |
| 505,189 | 9/1893 | Climer | 83/665 |
| 1,607,879 | 11/1926 | Drucker | 83/676 |
| 2,071,414 | 2/1937 | Lowrie | 83/481 X |
| 3,367,225 | 2/1968 | Stanford et al. | 83/501 X |
| 3,587,382 | 6/1971 | Boyd | 83/698 X |
| 3,894,461 | 7/1975 | Jakob | 83/665 |
| 3,899,948 | 8/1975 | Jakob | 83/665 X |
| 3,908,499 | 9/1975 | Reed | 83/665 |
| 4,168,643 | 9/1979 | Takimoto et al. | 83/500 X |

*Primary Examiner*—Frank T. Yost
*Assistant Examiner*—Robert P. Olszewski
*Attorney, Agent, or Firm*—Boyce C. Dent

[57] ABSTRACT

Rotary slitting apparatus for slitting paperboard material including a pair of coacting knife holders for mounting on parallel adjacent rotatable shafts, such holders having thin flexible annular slitting blades clamped thereon at a slight angle to a plane normal to the axis of the shafts so that the blades overlap slightly to provide scissors-action cutting of paperboard material passed between the heads.

6 Claims, 11 Drawing Figures

FIG. 7
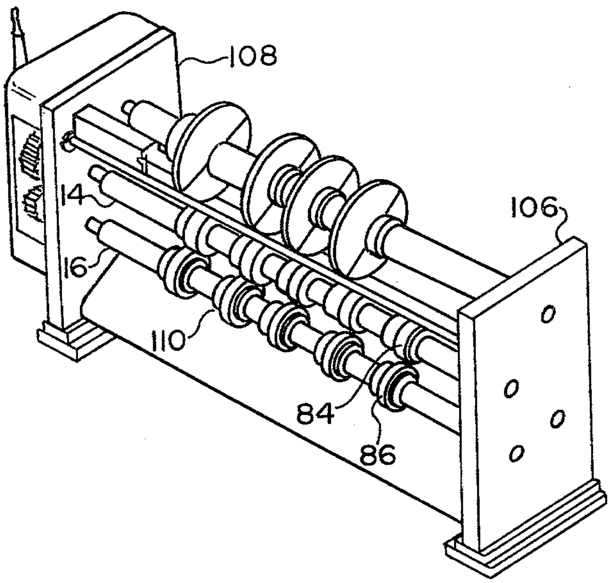
FIG. 9
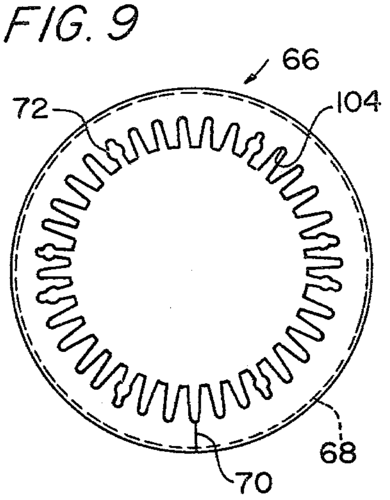
FIG. 8
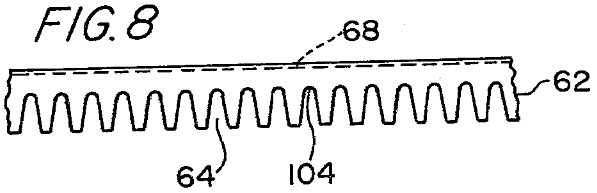
FIG. 11
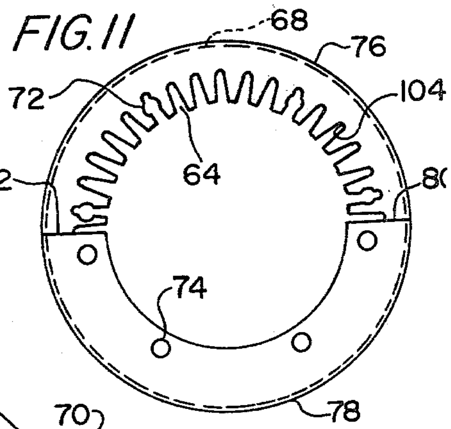
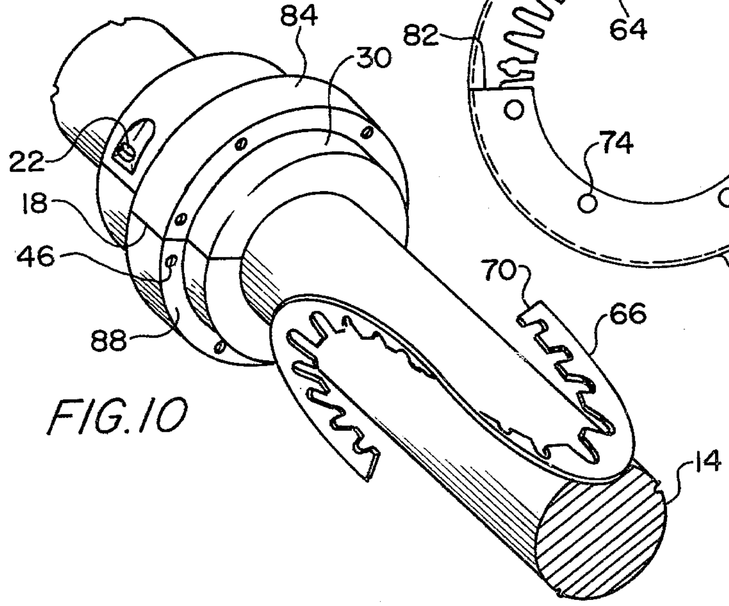
FIG. 10

PAPERBOARD SLITTING APPARATUS

BRIEF SUMMARY OF THE INVENTION

The invention is directed to an improved slitting knife and knife head arrangement for slitting paperboard webs and sheets. Briefly, the slitting knife is made from a flexible band of notched cutting rule that is bent into circular form to fit around a shoulder on the knife head. An annular side face is formed on the head adjacent the shoulder and extends at an angle from the central axis of the head toward its outer periphery. A clamp ring is used to hold the knife on the head; the clamp ring is similarly angled so that the knife is held tightly against the angled side face resulting in the knife becoming slightly dish-shaped when clamped in place. Since the knife acts in conjunction with a similar knife on an adjacent head (such heads being mounted on adjacent parallel shafts), the knives act like a pair of circular scissors to slit paperboard passing between them. The knife is axially cut from its inner to outer surfaces so that it may be twisted to pass over the head support shaft for mounting on the head. Alternatively, the knife may be in two cooperating halves, made either by bending straight cutting rule or by blanking flat stock.

PRIOR ART STATEMENT

Paperboard webs and sheets, and particularly those made of corrugated paperboard, are conventionally slit by rigid hardened steel rotary knives mounted for coaction on knife supports or heads supported on adjacent parallel rotary shafts. The web is an endless web of corrugated paperboard which is divided into several narrower endless strips for subsequent transverse cutting into discrete sheets which are used to make paperboard boxes. These same sheets or blanks are usually fed through a finishing machine which prints, scores, and slots them for folding into finished boxes. At least one side edge of the blank passing through the finishing machine is usually slit or trimmed to make the blank into a final desired width. Thus, the slitting knives are used both on the slitter-scorer portion of the web producing machine, such as a corrugator, and on the finishing machine for the blanks. Dent U.S. Pat. No. 3,489,043 illustrates one type of slitter-scorer for the corrugator on which the knife and head arrangement of the present invention may be used; FIG. 7 herein illustrates the scorer-slotter portion of the finishing machine on which the present invention may be used.

FIGS. 1, 2, and 3 illustrate the configuration of the conventional rigid knives and heads of the prior art mentioned above. The rigid knives are first made in one piece and then split into two halves so that they may be placed around the heads and bolted in place. The split must be precise to provide a continuous cutting edge. In addition, the cooperating faces of the knives must be undercut to provide a scissors-like cutting action. This is expensive since the blades must be made of a hardened alloy steel to provide the necessary wear properties; therefore, the undercut must be both machined and ground to obtain a sharp cutting edge. Thus, the material and the machining and grinding make the knives very expensive to produce. And, since the knives are hardened, they are very susceptible to chipping and are usually frequently replaced.

Accordingly, a general object of the present invention is to provide a simpler, less expensive slitting knife that can be easily replaced. More particularly, it is an object of this invention to provide a flexible one-piece slitting knife that is less expensive to produce than conventional knives and that may be quickly and easily mounted to the knife support. Alternatively, the knife may be made in two halves.

Upon information and belief, the only prior art patents of interest with respect to the present invention are Kuehn et al U.S. Pat. No. 3,318,206; Sauer U.S. Pat. No. 3,363,496; and Sauer U.S. Pat. No. 3,285,642. The Kuehn et al patent is of interest only in that it shows a thin scoring ring 36 sandwiched between a pair of scoring-profiled clamp rings 34; ring 36 is diametrically split such as the rigid slitting blades shown in FIGS. 1, 2, and 3 to illustrate the prior art. The scoring ring 36 is not clamped at an angle to the head, as in the present invention; it is not notched along its inner periphery, and it serves an entirely different function. Sauer U.S. Pat. No. 3,363,496 is of interest only in that it shows a hardened steel blade made in two halves 85 and 86 clamped in place against an annular side face of the head, such side face being made of both metal and a resilient plastic material. The blade is not clamped at an angle, as in the present invention; it is not notched along its inner periphery, and it serves an entirely different purpose. Sauer U.S. Pat. No. 3,363,496 is of interest only in that it shows, in FIG. 20, the blade halves 85 and 86 shown in FIG. 3 of the other Sauer U.S. Pat. No. 3,363,496.

Accordingly, the novel features and contruction of the present invention do not appear in the prior art recited.

BRIEF DESCRIPTION OF THE DRAWINGS

In the drawings wherein like parts are marked alike:

FIG. 7 is an isometric view of a typical scorer-slotter portion of a box blank finishing machine on which the present invention may be used;

FIG. 8 is a side view of a fragmentary portion of a cutting rule from which the slitting knife of the present invention may be made;

FIG. 9 is a side view of a completely formed unitary slitting knife of the present invention;

FIG. 10 is an isometric view showing the manner by which the slitting knife of the present invention may be twisted to pass it over the shaft holding the knife head for mounting the knife on the head; and FIG. 11 is a side view of a two-piece slitting knife of the present invention, the top half of which illustrates the type of knife illustrated in FIG. 9 and the bottom half of which illustrates an alternate construction of the knife.

DESCRIPTION OF THE PREFERRED EMBODIMENT

Figure 1:
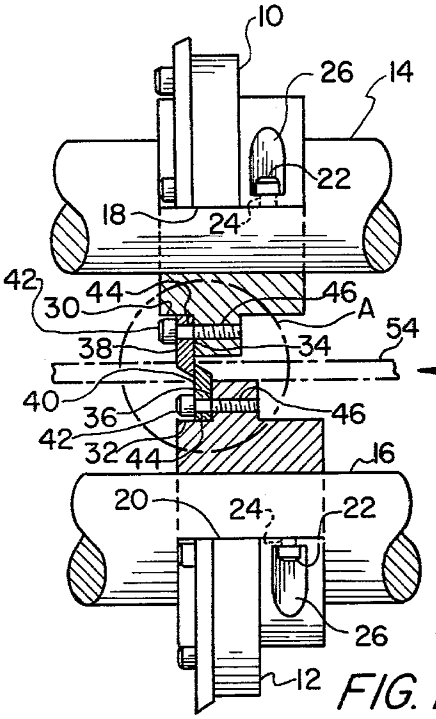
FIG. 1 is a front elevation in partial cross section showing a conventional slitting knife and head arrangement.
Figure 2:
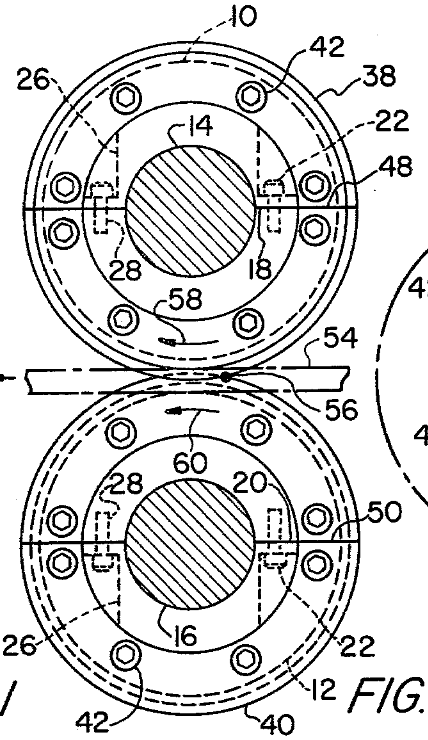
FIG. 2 is a side elevation of the arrangement of FIG. 1.
Figure 3:
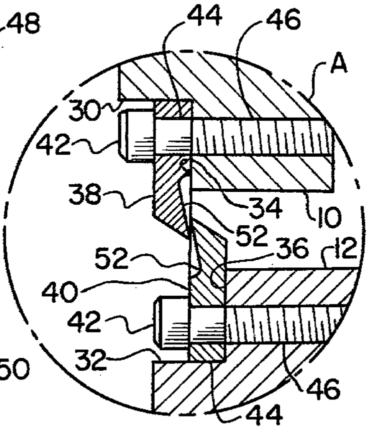
FIG. 3 PRIOR ART
FIG. 3 is an enlarged view of the portion of the slitting knives and heads shown within circle A on FIG. 1.

To fully appreciate the improvement of the present invention over the slitting apparatus of the prior art, it is believed helpful to understand the conventional slitting apparatus currently used. Referring to FIGS. 1, 2, and 3, a pair of substantially identical slitting knife holders or heads 10 and 12 are mounted on parallel, spaced rotatable shafts 14 and 16. The heads 10 and 12 are made in halves, being diametrically split along lines 18 and 20. The halves are held together on the shafts 14 and 16 by cap screws 22 passing through holes 24 extending from a recess 26 in one half and into threaded holes 28 in the other half as shown. Please note that FIG. 1 is sectioned as if one-quarter of the heads 10 and 12 has been removed to fully illustrate the arrangement.

The heads 10 and 12 include reduced diameter shoulder portions 30 and 32 forming annular side faces 34 and 36 that extend radially perpendicular to the central axes of the shafts 14 and 16. A pair of substantially identical slitting knife blades 38 and 40 surround the shoulders 30 and 32 and are clamped against the side faces 34 and 36 by cap screws 42 passing through holes 44 in the knives 38 and 40 and into threaded holes 46 in the heads 10 and 12. The knife blades 38 and 40 are also diametrically split along lines 48 and 50, as best shown in FIG. 2, so that they may be passed around the shafts 14 and 16 and secured to their respective heads 10 and 12.

The cutting profile of knives 38 and 40 is best illustrated in FIG. 3 which is an enlargement of the area of the parts shown within the circle A in FIG. 1. The knife blades 38 and 40 are beveled as shown at about 30° from a line parallel to the central axis of the heads 10 and 12 upon which they are mounted. In addition, one side face of each knife includes an undercut 52 thereby providing an extremely sharp edge at the outer periphery of the knife. The knives are mounted on the heads facing each other so that the cooperating sharp edges act like a pair of annular scissors as they slit the paperboard 54 (FIG. 2) passing between them. Since the periphery of the knives overlap, cutting of the paperboard 54 occurs at point 56 shown in FIG. 2 which is the intersection of the cutting edges as the knives rotate in the direction of arrows 58 and 60.

The knives 38 and 40 are usually made from tool steel. The cutting profile is machined and then the knives are hardened to provide the needed wear characteristics. However, hardening usually causes a small amount of distortion. Therefore, the final shape is obtained by grinding which also assures that the knives are concentric. Finally, the knives, which are made in a continuous annular ring, are physically cracked along the lines 48 and 50 to make them into two-piece knives for mounting on the heads 10 and 12 as previously explained. It should also be noted that the knives are relatively thick, usually ranging in thickness from five to seven sixteenths of an inch, such thickness, of course, making them very rigid.

It is apparent that such knives are costly to produce, both as a result of material cost and also as a result of the machining and grinding operations needed to complete them. And, since the knives are hardened, their cutting edges are susceptible to chipping which often occurs in their working environment. Chipped cutting edges detract from cutting efficiency, often necessitating frequent replacement of the knives. Thus, it can be seen that a simpler, less expensive slitting knife arrangement is desirable.

In accordance with this invention, the knife blades are made from a band of tough tempered steel that is normally used to make rotary die cutting rules similar to those shown and described in Martin U.S. Pat. No. Re. 76,192. The cutting rule is shown in FIG. 8 and is generally denoted by numeral 62. It includes a plurality of notches 64 equally spaced along its length as shown which permits the rule to be formed in a circle as shown in FIG. 9 and generally denoted by numeral 66. The rule 62 has a beveled top edge 68 as best shown in FIG. 6; this bevel is preferably machined or ground on the rule while it is in a straight band form. The length of rule needed to form the annular rule 66 in the desired diameter can be cut from the band 62 and, after forming, will be a unitary split ring with the butt ends of the rule forming the dividing line 70. As best shown in FIG. 9, holes 72 are drilled in the ring 66 in the circumferential pattern needed to correspond to the hole spacing of the threaded holes 46 in the heads 10 and 12, such pattern best appearing in FIGS. 2 and 5.

Alternatively, a long length of the band 62 may be wound in a coil (not shown) and the needed length cut from the coil to form a slitting blade 66. Such coils may be furnished to the user who can cut off the proper length when needed. It should be understood that the band 62 is wound around a mandrel corresponding in diameter to the inside diameter of the finished blade 66. If, because of the springiness of the coil, the blade 66 tends to spring open when it is cut from the coil (leaving a gap at line 70), then the coil may be wound around a mandrel of smaller diameter to compensate for its opening up when released.

If desired, the knife blade 66 may be stamped from flat stock rather than being made from a band that is bent into a circle as previously described. In this event, the notches 64 may be omitted as shown in the lower half of FIG. 11, it being only desirable to stamp the mounting holes 74 (corresponding to holes 72 shown in FIG. 9). The beveled edge 68 is machined and/or ground on the periphery of the blade 76 after stamping.

It may also be desirable to form the knife blade in two halves although, as previously pointed out, it is preferably made in one piece with a single dividing line 70. A two piece knife blade is shown in FIG. 11, such Figure serving a dual purpose; the top half of FIG. 11 shows one half of a blade 76 made from a bent band 62 as previously described while the lower half shows a blade 78 made from a stamping also as previously described. It is to be understood that two halves 76 or two halves 78 are used together to form a single blade. FIG. 11 shows that the blade halves are divided along lines 80 and 82, forming two individual pieces.

Figure 4:
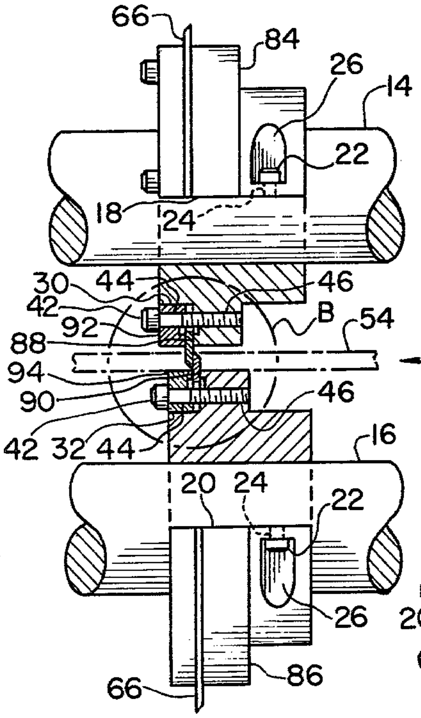
FIG. 4 is a front elevation in partial cross section, similar to FIG. 1, showing the slitting knife and head arrangement of the present invention.
Figure 5:
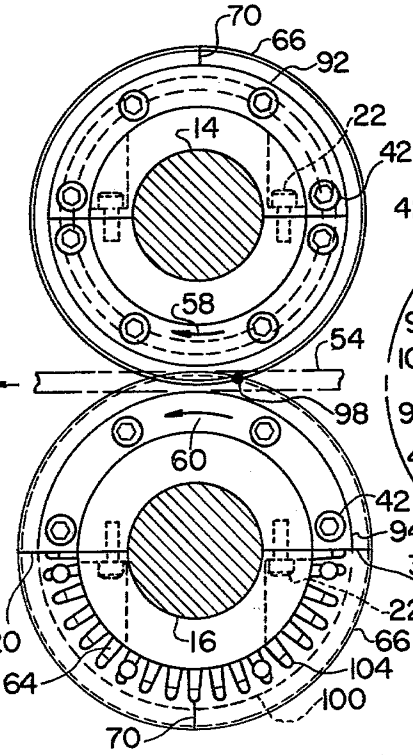
FIG. 5 is a side elevation of the arrangement of FIG. 4.
Figure 6:
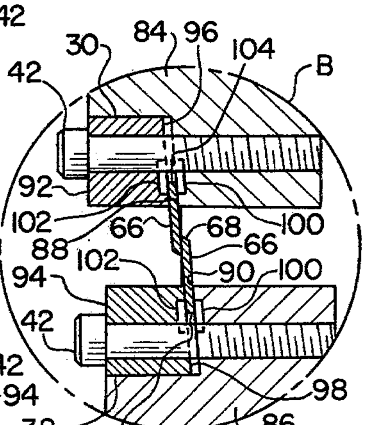
FIG. 6 is an enlarged view of the portion of the slitting knives and heads shown within circle B on FIG. 4.

The arrangement of the slitting blades and head members of the present invention is shown in FIGS. 4–6. A pair of substantially identical slitting knife heads 84 and 86 are mounted on the shafts 14 and 16 as previously described in connection with heads 10 and 12. Heads 84 and 86 are similar to heads 10 and 12 and similar parts are identified by the same numbers previously used. The heads 84 and 86 are divided and held on the shafts 14 and 16 as previously described. FIG. 4 is sectioned the same as FIG. 1 to illustrate the arrangement. The reduced diameter shoulder portions 30 and 32 form annular side faces 88 and 90 that extend radially at an angle from the central axis of the heads 84 and 86. Such angle is preferably made at five degrees from a line extending radially perpendicular from the central axis of the heads although the angle is not critical; it may be as small as three degrees and as much as seven. If less than three degrees, the knives 66 may not be dished enough to correspond to the undercut 52 in knives 38 and 40 as will be subsequently explained. If more than seven degress, the knives may not deflect evenly.

A knife blade 66 surrounds each shoulder 30 and 32 on the respective heads 84 and 86. The blades are clamped against the side faces 88 and 90 by clamp rings 92 and 94, each of which is divided along lines 18 and 20 thereby forming two-piece clamp rings that can be mounted around the heads without difficulty as previously explained. The clamp rings 92 and 94 include inner annular side faces 96 and 98 respectively (see FIG. 6) extending at an angle from the central axis of the heads 84 and 86; such angle corresponds to the angle of the side faces 88 and 90 on the heads. Thus, when the clamp rings are drawn up tightly against the knife blades by screws 42, they deform or deflect the blades from their normally flat plane into the dish shape best illustrated in FIG. 6. By comparing FIG. 6 to FIG. 3, it can be seen that the dish shape of the blades 66 provides a configuration similar to that provided by the undercuts 52 in the blades 38 and 40, that is, the outer cutting edges of the blades 66 act like a pair of circular scissors as they cut through the paperboard 54 passing between them. The beveled outer face 68 on blades 66 enhance this scissors action by providing sharp coacting cutting edges that rub against each other as the blades rotate. Bevel 68 extends at an angle with respect to the side faces of the blades, forming an acute cutting angle with the side face. This angle is preferably about five degrees although it may be as much as forty-five degrees. If less than five degrees, cutting is impaired and, if more than forty-five degrees, the edges are too sharp and are more apt to chip which is an undesirable characteristic as pointed out with respect to the blades 38 and 40. The scissors action of the blades causes them to cut the paperboard 54 at point 98 (FIG. 5) as it passes between them.

Each head 84 and 86 includes a relief groove 100 formed in the face of side faces 88 and 90; similarly, each clamp ring 92 and 94 includes a relief groove 102 in their angled side faces 96 and 98 that are axially opposite to the grooves 100. All of these grooves span the top 104 of the notches 64 in blades 66, the reason being that when the band 62 is bent into circular form, the metal deformed by bending tends to extend beyond the side faces of the blades. The grooves provide a space into which such deformed metal can go. Of course, the deformed metal could be removed by machining but this adds to the cost of the blades. In addition, in the instance where the user cuts a blade from a coil of band 62, he is not likely to have such machining capability. The groove 100 in lower head 86 also appears in FIG. 5 in which the lower half of clamp ring 94 has been removed to show the blade 66 with groove 100 behind it.

As previously mentioned, the slitting apparatus of the present invention may be used on a conventional slitter-scorer machine for corrugators such as shown in Dent U.S. Pat. No. 3,489,043. It may also be used on a conventional scorer-slotter machine such as diagrammatically illustrated in FIG. 7. This machine usually forms a portion of a complete blank finishing machine as will be well understood by those skilled in the art. The most visible pair of shafts, denoted by numerals 14 and 16 to conform to FIGS. 1 and 4, are supported for rotation in spaced parallel relation between side frames 106 and 108 in the known manner. These shafts support a plurality of scoring heads 110 which may be yoked for lateral movement with downstream slotting heads 112 (yokes not shown), also in the known manner. The last pair of heads on the right end of FIG. 7 are usually slitting heads, such as heads 84 and 86 of the present invention.

The slitter-scorer machine and scorer-slotter share one thing in common; any elements placed around the shafts 14 and 16 must be divided in half to be placed around the shafts so that the shafts do not have to be removed from the machine to slide the elements lengthwise onto the shafts. As described in connection with FIGS. 1 and 2, the heads 10 and 12 are diametrically split as are the slitting blades 38 and 40. In accordance with this invention, blade 66, having a radial split 70, may be spread apart in the manner illustrated in FIG. 10. This permits the blade to be slipped over the shaft 14 after which it will resume its circular configuration as shown in FIG. 9. Then the blade 66 may be slipped over the shoulder portion 30 of head 84 and clamped against side face 88 by clamp ring 92 by using screws 42 (clamp ring and screws not shown in FIG. 10) which will result in the assembly of the parts as shown in FIG. 6.

Nevertheless, if desired, the blade 66 may be made in two halves 76 or 78 such as described in connection with FIG. 11. Thus, both halves of the blade may be placed around the shoulder 30 and clamped in place as previously described. It will be appreciated that if the blade is made in two halves, it will have to be cracked along lines 80 and 82 so that its outer edge will be continuous when the halves are clamped to the head. It can be seen that when a length of band 62 is cut to form a blade 66, the exact length may be cut off so that no cracking is necessary.

The operation of the apparatus of this invention is believed to be clear from the foregoing description. Suffice to say that blades 66, or 76 or 78 as the case may be, are clamped to the heads 84 and 86 which have already been secured to shafts 14 and 16. The blades are clamped tightly so as to be deformed into the dished shape shown in FIG. 6. The head 86 is moved along shaft 16 to the position desired for trimming the paperboard 54. The other head 84 is moved toward head 86 until the cutting edges of blades 66 are touching; the heads are clamped in place on the shafts. Thereafter, the shafts 14 and 16 are rotated by the machine in which they are mounted. Paperboard 54 is passed between the heads 84 and 86 and the blades 66 trim off the excess width to be trimmed.

The slitting heads 84 and 86 have been described as being substantially the same diameter. As well understood by those skilled in the art, they may be of different diameters depending on whether they are used on the scorer or slotter shafts of the scorer-slotter machine illustrated in FIG. 7 or used on a slitter-scorer machine as referred to herein, space requirements and the like. Regardless of how used, the blades 66 are made at a diameter approximately in proportion to the size of the heads to provide the overlap of the blades described herein.

Also, the slitting heads 84 and 86 have been illustrated in FIGS. 4 and 6 as having the shoulder portions 30 and 32 on the same side of both heads. It should be understood that both heads may be made the same as the lower head 86; that is, the side face 90 would taper from the shoulder 32 outwardly toward the left side face of the head 86 as shown. In this event, the upper head 84 would merely be reversed on the shaft 14 so that the blades 66 would face each other as shown in FIG. 6.

Although the rotary slitting apparatus of this invention has been described for use in slitting paperboard webs and sheets, and particularly corrugated paperboard, it should be understood that it may also be used for slitting webs of other materials such as solid fiber webs and sheets, plastic materials, and the like.

Thus, the invention having been described in its best embodiment and mode of operation, that which is desired to be claimed by Letters Patent is:

1. Rotary slitting apparatus for slitting paperboard material comprising in combination:

an annular head member including a reduced diameter shoulder portion adjacent one side face thereof forming a first annular side face extending at a small angle of from between 3 degrees and 7 degrees from a line extending radially perpendicular from a central axis of said head member towards a larger diameter surface thereon;

a thin annular slitting blade member adjacent said first annular side face and including an inner annular surface surrounding said reduced diameter shoulder portion and having a plurality of circumferentially spaced notches extending radially part way from said inner annular surface toward an outer annular surface, said outer annular surface extending at an angle of from between 5 degrees and 40 degrees from a plane perpendicular to side faces thereof forming an acute angle cutting edge with one of said side faces; and an annular clamp member including an inner annular surface surrounding said reduced diameter shoulder portion and having a second annular side face, adjacent said blade member, extending radially at an angle from a central axis of said head member so as to correspond to said small angle of said first annular side face for clamping said blade member at an angle against said first annular side face on said head member, said head member further including an annular relief formed in said first annular side face opposite to the termination of said notches in said slitting blade member, and said clamp member further including an annular relief formed in said second annular side face opposite to the termination of said notches in said slitting blade member.

2. The apparatus of claim 1 wherein:

said slitting apparatus is adapted for use on a rotatable shaft means in a slitter-scorer machine for slitting an advancing endless web of paperboard material into at least two widths.

3. The apparatus of claim 1 wherein:

said slitting apparatus is adapted for use on a rotatable shaft means in a scorer-slotter machine for slitting trim edges of a plurality of serially advancing blanks of paperboard material.

4. The apparatus of claim 1 wherein:

said slitting blade member is divided radially from an inner annular surface to an outer annular surface thereof forming a unitary separable blade.

5. The apparatus of claim 4 wherein:

said slitting blade member is flexible and adapted for installation on said head member by twisting said blade around a shaft means supporting said head member.

6. The apparatus of claim 1 wherein:

said slitting blade member is divided diametrically radially from an inner annular surface to an outer annular surface thereof forming a two-piece separable blade.

* * * * *